Sept. 8, 1931.  C. O. MARSHALL  1,822,537
ADVERTISING DEVICE
Filed Jan. 5, 1928
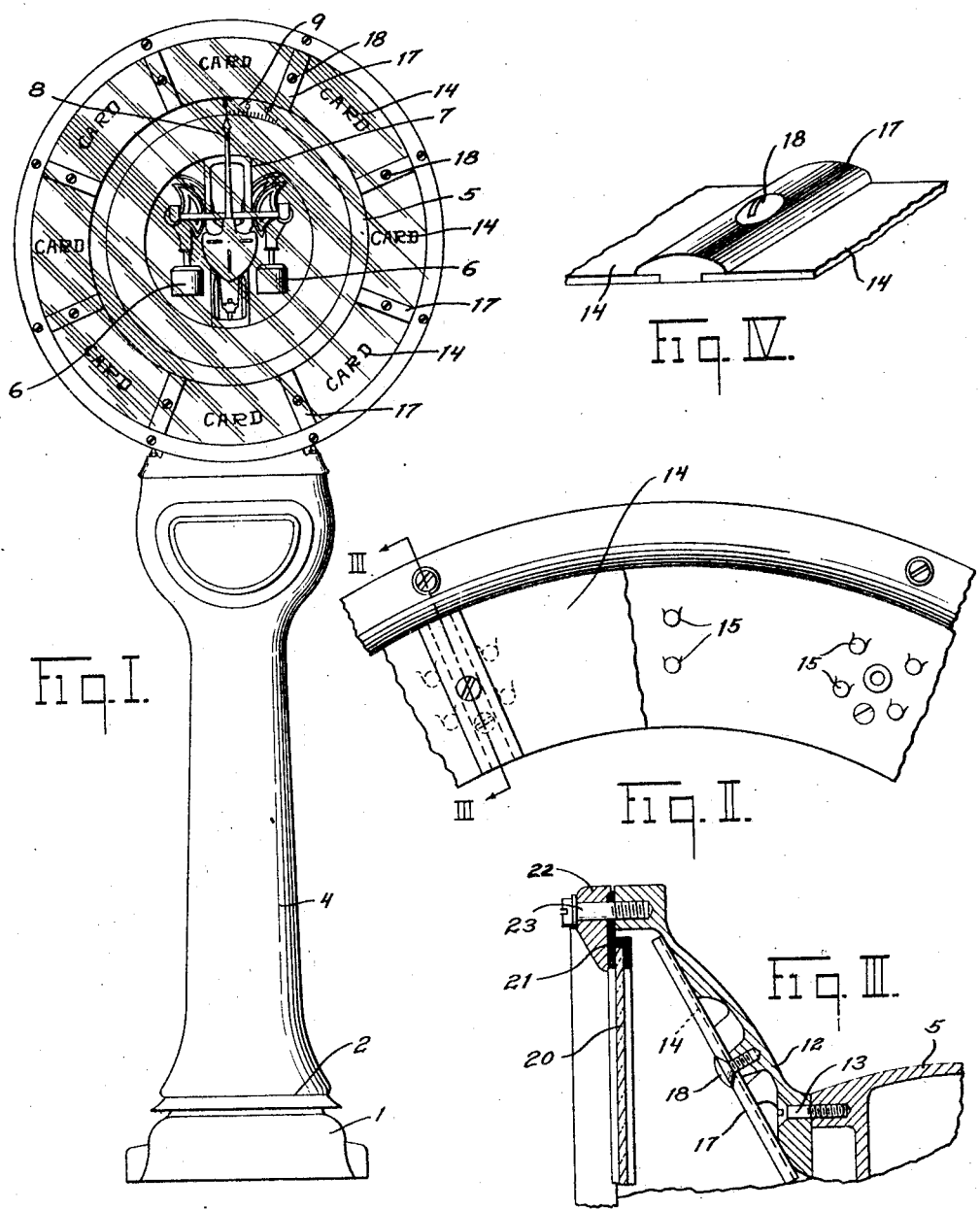
Inventor
Charles O. Marshall
by
H. O. Arnsberger
Attorney Patented Sept. 8, 1931

1,822,537

UNITED STATES PATENT OFFICE

CHARLES O. MARSHALL, OF TOLEDO, OHIO, ASSIGNOR TO TOLEDO SCALE MANUFACTURING COMPANY, OF TOLEDO, OHIO, A CORPORATION OF NEW JERSEY

ADVERTISING DEVICE

Application filed January 5, 1928. Serial No. 244,589.

This invention relates to advertising means, and more particularly to means which may be used in conjunction with other mechanism, and I have illustrated as a preferred embodiment thereof a weighing scale of the person weigher type. It is to be understood, however, that the advertising means of my invention is also adapted for use with other devices, for example, vending machines, amusement devices, etc., and I contemplate the employment of the advertising means of my invention wherever applicable.

One of the principal objects of this invention is the provision of a simple advertising means which may be used in conjunction with a weighing scale or other device without necessitating a rearrangement of parts of the weighing machine.

Another object is the provision of an advertising card holder which is constructed as an independent unit and may be incorporated in a weighing scale without the use of special equipment and tools.

Another object is the provision of an advertising card holder for use in conjunction with a weighing scale which is so constructed as to replace the bezel normally securing the glazed cover to the scale housing.

Still another object is the provision of an advertising card holder which may be affixed to a weighing scale without interfering with the weighing mechanism or obscuring the weight indication from the view of the scale user.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a weighing scale embodying my invention.

Figure II is an enlarged fragmentary detail view of a portion of the advertising card holder showing a portion of an advertising display card removed.

Figure III is a vertical sectional view through a portion of the weighing scale housing and card holder.

Figure IV is an enlarged isometric view showing the method of securing the advertising cards in the holder.

Referring to the drawings in detail, I have shown the device of my invention as incorporated in a weighing scale of the type known as a person weigher, with which, because of its inherent advertising nature, my device is particularly well adapted. As my invention does not form a part of the weighing mechanism per se, I will only describe it with such particularity as to clearly show the connection of my invention therewith.

As illustrated in the drawings, the scale proper comprises a base 1 housing and supporting lever mechanism (not shown) which supports a load receiving platform 2 of comparatively small area so that several persons cannot stand upon the platform at the same time. Erected upon the rear end of the base 1 is an upwardly extending hollow column 4 surmounted by a watch case-shaped casing 5 within which is supported the automatic load counterbalancing and indicating mechanism.

The load counterbalancing mechanism illustrated is of substantially the automatic pendulum type described and claimed in U. S. patent to Hapgood No. 1,203,611. It consists substantially of a pair of oppositely swinging pendulums 6 supported upon an upright frame 7 and adapted to swing upwardly and outwardly to offset the load on the scale platform. The pendulum mechanism is suitably connected by means of rack and pinion mechanism (not shown) to an indicator hand 8 which is adapted to co-operate with a chart 9 to indicate the weight of the load.

The advertising card holder of my invention comprises a flaring annulus 12 secured to the housing 5 by means of screws 13 and is adapted to receive and retain a plurality of cards 14 bearing advertising display matter. The cards 14 are adapted to rest upon a plurality of small bosses 15 and are held in place by means of escutcheons or bars 17, the latter being secured to the annulus 12 by means of screws 18. I have provided a suitable glazed cover for the card holding annulus comprising a pane of glass 20 supported in a gasket 21 of rubber or other suitable material and held in place by means of an annular bezel 22 held in place with screws 23.

It is apparent that the card holder completely surrounds the weight indicating chart and does not in any way affect the weighing mechanism or obscure the weight indication from view. When it is desirable to change the advertising display cards the bezel 22 may be removed and the card retaining escutcheons loosened by backing out the screws 18, after which operation the cards may be removed and others substituted. The card holder of my invention is a complete independent unit which may be incorporated into scales having circular dial housings, it being only necessary to remove the usual glass retaining bezel (not shown) and substituting the structure hereinbefore described.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, weight indicating mechanism, a substantially circular frame, said circular frame surrounding and displaying said weight indicating mechanism; means on said frame for securing advertising matter thereto, means for attaching said frame to said mechanism and a glazed water-tight cover for said frame.

2. In a device of the class described, in combination, weight indicating mechanism, a substantially circular frame, said circular frame surrounding and displaying said weight indicating mechanism; means on said frame for securing a card bearing advertising matter to said frame, means for attaching said frame to said mechanism and a glazed water-tight cover for said frame.

3. In a device of the class described, in combination, a weighing scale and weight indicating mechanism, a substantially circular frame secured to said scale, said circular frame surrounding and displaying said weight indicating mechanism; means on said frame for securing a plurality of advertising display cards thereto, means for attaching said frame to said weighing scale and a glazed water-tight cover for said frame.

4. In a device of the class described, in combination, a weighing scale housing containing weight indicating means, an integral annular frame entirely surrounding said indicating means and angularly extending away from said housing, said frame having provisions for receiving, securing and displaying a plurality of advertising cards, means for securing said frame to said housing, and means including a resilient gasket and a transparent medium forming a water-tight cover for said frame and indicating means.

5. In a device of the class described, in combination, a weighing scale housing adapted to contain weight indicating means, an angularly extending annular frame, the opening of said frame being adapted to display the weight indicating means, the body of said frame being adapted to have secured thereto a plurality of advertising cards, means for securing said cards to said body, means for securing said frame to said housing, and a glazed bezel and rubber gasket means for enclosing and weather-proofing the chamber so formed.

6. In a device of the class described, in combination, a weighing scale housing, weight indicating mechanism supported in said housing, said housing being adapted to receive a glazed bezel for displaying said weight mechanism, a frame adapted to display advertising matter, a glazed cover for said frame, and means whereby said frame may be substituted for said bezel with said glazed cover displaying said indicating mechanism and said advertising matter.

CHARLES O. MARSHALL.